United States Patent
Erkelenz et al.

(10) Patent No.: US 9,651,712 B2
(45) Date of Patent: May 16, 2017

(54) POLYMER COMPOSITION WITH HEAT-ABSORBING PROPERTIES

(71) Applicant: Bayer Intellectual Property GmbH, Monheim (DE)

(72) Inventors: Michael Erkelenz, Duisburg (DE); Rolf Wehrmann, Krefeld (DE); Anke Boumans, Goch (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/352,712

(22) PCT Filed: Oct. 15, 2012

(86) PCT No.: PCT/EP2012/070423
§ 371 (c)(1),
(2) Date: Apr. 18, 2014

(87) PCT Pub. No.: WO2013/057074
PCT Pub. Date: Apr. 25, 2013

(65) Prior Publication Data
US 2014/0252282 A1    Sep. 11, 2014

(30) Foreign Application Priority Data

Oct. 18, 2011  (EP) ..................................... 11185674

(51) Int. Cl.
| | | |
|---|---|---|
| *F21V 9/04* | (2006.01) | |
| *F21V 9/06* | (2006.01) | |
| *G02B 5/22* | (2006.01) | |
| *G02B 5/26* | (2006.01) | |
| *G02B 1/04* | (2006.01) | |
| *C08K 3/04* | (2006.01) | |
| *C08K 3/38* | (2006.01) | |
| *C08K 3/24* | (2006.01) | |
| *C08K 5/50* | (2006.01) | |
| *C08K 3/10* | (2006.01) | |
| *C08J 3/00* | (2006.01) | |
| *C08J 3/22* | (2006.01) | |

(52) U.S. Cl.
CPC ................ *G02B 1/041* (2013.01); *C08K 3/04* (2013.01); *C08K 3/24* (2013.01); *C08K 3/38* (2013.01); *C08K 5/50* (2013.01); *C08K 2201/011* (2013.01)

(58) Field of Classification Search
USPC .......... 252/62, 587; 428/220, 334, 335, 336, 428/337; 524/100, 105, 115, 121, 153, 524/154, 406; 523/351
See application file for complete search history.

(56) References Cited

U.S. PATENT DOCUMENTS

| | | |
|---|---|---|
| 2,991,273 A | 7/1961 | Hechelhammer et al. |
| 2,999,825 A | 9/1961 | Floyd et al. |
| 2,999,846 A | 9/1961 | Schnell et al. |
| 3,028,635 A | 4/1962 | Herubel |
| 3,148,172 A | 9/1964 | Fox et al. |
| 3,271,367 A | 9/1966 | Schnell et al. |
| 3,879,348 A | 4/1975 | Serini et al. |
| 4,101,513 A | 7/1978 | Fox et al. |
| 4,395,463 A | 7/1983 | Kray |
| 4,707,393 A | 11/1987 | Vetter |
| 4,982,014 A | 1/1991 | Freitag et al. |
| 5,041,313 A | 8/1991 | Patel |
| 5,288,778 A | 2/1994 | Schmitter et al. |
| 5,391,795 A | 2/1995 | Pickett |
| 5,627,256 A | 5/1997 | Meier et al. |
| 5,821,380 A | 10/1998 | Holderbaum et al. |
| 5,844,028 A | 12/1998 | Paulik |
| 5,846,659 A | 12/1998 | Löwer et al. |
| 5,869,185 A | 2/1999 | Bahr et al. |
| 5,883,165 A | 3/1999 | Kröhnke et al. |
| 6,093,759 A | 7/2000 | Gareiss et al. |
| 6,350,512 B1 | 2/2002 | Hurley et al. |
| 7,442,430 B2 | 10/2008 | Buckel et al. |
| 2003/0022967 A1* | 1/2003 | Dobler et al. ................ 524/100 |
| 2004/0131845 A1 | 7/2004 | Fujita |
| 2005/0161642 A1 | 7/2005 | Takeda |
| 2006/0178254 A1 | 8/2006 | Takeda |
| 2009/0136730 A1* | 5/2009 | Nakano et al. ................ 428/220 |
| 2011/0144250 A1* | 6/2011 | Meyer et al. ................. 524/115 |
| 2012/0153241 A1 | 6/2012 | Meyer et al. |

FOREIGN PATENT DOCUMENTS

| | | |
|---|---|---|
| DE | 1961668 U | 6/1967 |
| DE | 1570703 A1 | 2/1970 |
| DE | 2036052 A1 | 1/1972 |

(Continued)

OTHER PUBLICATIONS

International Search Report for PCT/EP2012/070423 mailed Dec. 13, 2012.

*Primary Examiner* — Bijan Ahvazi

(74) *Attorney, Agent, or Firm* — Drinker Biddle & Reath LLP

(57) ABSTRACT

The invention relates to polymer compositions for the production of mouldings, in particular spectacles and eye-protection equipment, which comply with the provisions of EN 169 (welder protection standard) and EN 1836/2005 (signal light detection). The compositions and mouldings are in particular processable at temperatures above 265° C., recyclable and have a notched impact strength of at least 65 kJ/cm$^2$, and they comply with the required optical standards mentioned above.

12 Claims, No Drawings

(56) References Cited

FOREIGN PATENT DOCUMENTS

| | | |
|---|---|---|
| DE | 2063050 A1 | 7/1972 |
| DE | 2211956 A1 | 10/1973 |
| DE | 2804283 A1 | 8/1978 |
| DE | 3121385 A1 | 8/1982 |
| DE | 3832396 A1 | 2/1990 |
| DE | 10257079 A1 | 6/2004 |
| DE | 10392543 T5 | 4/2005 |
| EP | 0110221 A2 | 6/1984 |
| EP | 0110238 A2 | 6/1984 |
| EP | 0500496 A1 | 8/1992 |
| EP | 0570165 A2 | 11/1993 |
| EP | 0716919 A2 | 6/1996 |
| EP | 0718354 A2 | 6/1996 |
| EP | 0728811 A2 | 8/1996 |
| EP | 0839623 A1 | 5/1998 |
| EP | 1188792 A1 | 3/2002 |
| EP | 1308084 A1 | 5/2003 |
| EP | 1342753 A1 | 10/2003 |
| EP | 1559743 A1 | 8/2005 |
| EP | 1865027 A1 | 12/2007 |
| EP | 2009057 A1 | 12/2008 |
| FR | 1561518 A | 3/1969 |
| GB | 1122003 A | 7/1968 |
| GB | 1229482 A | 4/1971 |
| GB | 1367790 A | 9/1974 |
| JP | 062039/1986 | 3/1986 |
| JP | 062040/1986 | 3/1986 |
| JP | 105550/1986 | 5/1986 |
| JP | 2006219662 A | 8/2006 |
| JP | 2008024902 A | 2/2008 |
| JP | 2008150548 A | 7/2008 |
| JP | 2008214596 | 9/2008 |
| WO | WO96/15102 A2 | 5/1996 |
| WO | WO97/40092 A1 | 10/1997 |
| WO | WO-2005037932 A1 | 4/2005 |
| WO | WO-2006/108520 A1 | 10/2006 |
| WO | WO-2007008476 A2 | 1/2007 |
| WO | WO-2008/071363 A2 | 6/2008 |
| WO | WO-2008/109072 | 9/2008 |
| WO | WO-2008134517 A1 | 11/2008 |
| WO | WO-2009/059901 A2 | 5/2009 |
| WO | WO-2012080395 A1 | 6/2012 |

* cited by examiner

POLYMER COMPOSITION WITH HEAT-ABSORBING PROPERTIES

CROSS-REFERENCE TO RELATED APPLICATIONS

This application is a national stage application (under 35 U.S.C. §371) of PCT/EP2012/070423, filed Oct. 15, 2012, which claims benefit of European Application No. 11185674.6, filed Oct. 18, 2011, both of which are incorporated herein by reference in their entirely.

The invention relates to polymer compositions for the production of mouldings, in particular spectacles and eye-protection equipment, which comply with the provisions of EN 169 (welder protection standard) and of EN 1836/2005 (signal light detection).

The compositions and mouldings are in particular processable at processing temperatures above 265° C., recyclable and have a notched impact strength of at least 65 kJ/cm$^2$, and they comply with the required optical standards mentioned above.

In addition, the compositions can be prepared in various shades of colour and are more readily lacquerable than known compositions.

The present invention relates in addition to the use of the polymer compositions in the production of mouldings, in particular spectacles and eye-protection equipment, which comply with the provisions of EN 169 (welder protection standard), and to a process for the production of the mouldings.

Compositions which satisfy the above-mentioned standards are known from the prior art, but they have only relatively low temperature stability, in particular during processing, and, as a result, unsatisfactory recyclability, as well as a relatively low notched impact strength. Furthermore, the signal light detection is only inadequate in the compositions known from the prior art, that is to say signal colours in the visible range of the spectrum are falsified or are no longer to be detected as such.

Accordingly, the object of the present invention was to provide polymer compositions which do not have the disadvantages of the compositions known from the prior art, in particular compositions having a high processing temperature, high notched impact strength, good dyeability and good recyclability, and which ensure good signal light detection.

The recycling of the materials is of interest here not only for the return of rejects but also on account of the relatively short lifetime of the moulding, due to the application.

The invention provides thermoplastic moulding compositions comprising

A) from 73.9750 to 99.9948 wt. %, preferably from 85.00 wt. % to 99.90 wt. %, particularly preferably from 95.00 to 98.00 wt. %, of at least one transparent thermoplastic plastic, preferably polycarbonate, copolycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copolyacrylates and poly- or copolymethacrylate such as, for example, poly- or copolymethyl methacrylates (such as PMMA), as well as copolymers with styrene, such as, for example, transparent polystyrene acrylonitrile (PSAN), thermoplastic polyurethanes, polymers based on cyclic olefins (e.g. TOPAS®, a commercial product of Ticona), more preferably polycarbonate, copolycarbonate, polyester carbonate, aromatic polyesters or polymethyl methacrylate, or mixtures of the mentioned components, and particularly preferably polycarbonate and copolycarbonate, the transparent thermoplastic plastic particularly preferably being added in an amount such that, with components B) to K), it yields 100 wt. %;

B) from 0.05 to 0.50 wt. %, preferably from 0.10 to 0.45 wt. %, particularly preferably from 0.20 to 0.40 wt. %, of at least one UV stabiliser;

C) from 0 part by weight to 1.00 part by weight, more preferably from 0.05 part by weight to 0.75 part by weight, particularly preferably from 0.15 part by weight to 0.60 part by weight, and most particularly preferably from 0.20 part by weight to 0.50 part by weight, of at least one demoulding agent;

D) from 0.0001 to 0.500 wt. %, preferably from 0.0004 to 0.2000 wt. %, particularly preferably from 0.0006 to 0.1000 wt. %, of at least one inorganic IR absorber, with the exception of carbon black, based on the pure inorganic IR absorber;

E) from 0 to 0.01 wt. %, preferably from 0.0001 to 0.0080 wt. %, particularly preferably from 0.0003 to 0.0060 wt. %, of at least one organic IR absorber, F) from 0 to 0.0150 wt. %, preferably from 0.0001 to 0.0130 wt. %, particularly preferably from 0.0002 to 0.0120 wt. %, carbon black;

G) from 0 to 1.0 wt. %, preferably from 0.01 to 0.50 wt. %, particularly preferably from 0.02 to 0.11 wt. %, of at least one heat stabiliser;

H) from 0 to 7.0 wt. % of at least one flame retardant;

I) from 0 to 15.00 wt. %, preferably from 0.05 to 5.0 wt. %, particularly preferably from 0.1 to 1.0 wt. %, of further additives;

K) from 0.0001 to 1.000 wt. %, preferably from 0.0002 to 0.50 wt. %, particularly preferably from 0.0004 to 0.2000 wt. %, of at least one organic dye or organic dye complexes, wherein the sum of the parts by weight of components A to K is 100 wt. %.

Component A)

Transparent thermoplastic plastics within the scope of the invention are polycarbonate, copolycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copolyacrylates and poly- or copolymethacrylate such as, for example, poly- or copolymethyl methacrylates (such as PMMA), as well as copolymers with styrene, such as, for example, transparent polystyrene acrylonitrile (PSAN), thermoplastic polyurethanes, polymers based on cyclic olefins (e.g. TOPAS®, a commercial product of Ticona).

Mixtures of a plurality of transparent thermoplastic polymers, provided that they can be mixed with one another to give a transparent mixture, are also possible, preference being given to a mixture of polycarbonate with PMMA (more preferably with PMMA <2 wt. %) or polyester.

A specific embodiment comprises in this context a mixture of polycarbonate and less than 2.0%, preferably less than 1.0%, more preferably less than 0.5%, PMMA, at least 0.01% PMMA being present, based on the amount of polycarbonate, the PMMA preferably having a molar weight of <40,000 g/mol. In a particularly preferred embodiment, the amount of PMMA is 0.2% and particularly preferably 0.1%, based on the amount of polycarbonate, the PMMA preferably having a molar weight of <40,000 g/mol.

A further specific embodiment comprises a mixture of PMMA and less than 2%, preferably less than 1%, more preferably less than 0.5%, yet more preferably 0.2% and particularly preferably 0.1%, polycarbonate, based on the amount of PMMA.

Particularly preferred polycarbonates are the homopolycarbonate based on bisphenol A, the homopolycarbonate based on 1,3-bis-(4-hydroxyphenyl)-3,3,5-trimethylcyclohexane, and the copolycarbonates based on the two monomers bisphenol A and 1,1-bis-4-hydroxyphenyl)-3,3,5-trimethylcyclohexane.

Polycarbonates within the scope of the present invention are both homopolycarbonates and copolycarbonates; the polycarbonates can in a known manner be linear or branched.

The preparation of the polycarbonates is carried out in a known manner from diphenols, carbonic acid derivatives, optionally chain terminators and branching agents.

Details of the preparation of polycarbonates have been laid down in many patent specifications for about 40 years. By way of example, reference is made here only to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne, BAYER AG, "Polycarbonates" in Encyclopedia of Polymer Science and Engineering, Volume 11, Second Edition, 1988, pages 648-718 and finally to Dres. U. Grigo, K. Kirchner and P. R. Muller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299. Diphenols suitable for the preparation of the polycarbonates are, for example, hydroquinone, resorcinol, dihydroxydiphenyls, bis-(hydroxyphenyl)-alkanes, bis(hydroxyphenyl)-cycloalkanes, bis-(hydroxyphenyl) sulfides, bis-(hydroxyphenyl) ethers, bis-(hydroxyphenyl) ketones, bis-(hydroxyphenyl)-sulfones, bis-(hydroxyphenyl) sulfoxides, alpha,alpha'-bis-(hydroxyphenyl)-diisopropylbenzenes, pththalimidines derived from isatin or phenolphthalein derivatives, and compounds thereof alkylated and halogenated on the ring.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxy-phenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

These and further suitable diphenols are described, for example, in U.S. Pat. Nos. 3,028,635, 2,999,825, 3,148,172, 2,991,273, 3,271,367, 4,982,014 and 2,999,846, in DE-A 1 570 703, DE-A 2 063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and in JP-A 62039/1986, JP-A 62040/1986 and JP-A 105550/1986.

In the case of homopolycarbonates, only one diphenol is used; in the case of copolycarbonates, several diphenols are used.

Suitable carbonic acid derivatives are, for example, phosgene or diphenyl carbonate.

Suitable chain terminators which can be used in the preparation of the polycarbonates are both monophenols and monocarboxylic acids. Suitable monophenols are phenol itself, alkylphenols such as cresols, p-tert-butylphenol, cumylphenol, p-n-octylphenol, p-isooctylphenol, p-n-nonylphenol and p-isononylphenol, halophenols such as p-chlorophenol, 2,4-dichlorophenol, p-bromophenol and 2,4,6-tribromophenol, 2,4,6-triiodophenol, p-iodophenol, and mixtures thereof.

Preferred chain terminators are phenol, cumylphenol and/or p-tert-butylphenol.

Suitable monocarboxylic acids are also benzoic acid, alkylbenzoic acids and halobenzoic acids.

Preferred chain terminators are also the phenols which are mono- or poly-substituted by C1- to C30-alkyl radicals, linear or branched, preferably unsubstituted or substituted by tert-butyl.

The amount of chain terminator to be used is preferably from 0.1 to 5 mol %, based on moles of diphenols used in a particular case. The addition of the chain terminators can take place before, during or after the phosgenation.

Suitable branching agents are the compounds having a functionality of three or more than three known in polycarbonate chemistry, in particular those having three or more than three phenolic OH groups.

Suitable branching agents are, for example, phloroglucinol, 4,6-dimethyl-2,4,6-tri-(4-hydroxyphenyl)-hept-2-ene, 4,6-dimethyl-2,4,6-tri(4-hydroxyphenyl)-heptane, 1,3,5-tri (4-hydroxy-phenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propene, 2,4-bis-(4-hydroxyphenylisopropyl)-phenol, 2,6-bis-(2-hydroxy-5'-methyl-benzyl)-4-methylphenol, 2-(4-hydroxyphenyl)-2-(2, 4-dihydroxy-phenyl)-propane, hexa-(4(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4', 4"-dihydroxytriphenyl)-methyl)-benzene as well as 2,4-dihydroxybenzoic acid, trimesic acid, cyanuric chloride and 3,3-bis(3-methyl-4-hydroxyphenyl)-2-oxo-2,3-dihydroindole.

The amount of branching agents optionally to be used is preferably from 0.05 mol % to 2.00 mol %, again based on moles of diphenols used in a particular case.

The branching agents can either be placed in the aqueous alkaline phase with the diphenols and the chain terminators or they can be dissolved in an organic solvent and added before the phosgenation. In the case of the transesterification process, the branching agents are used together with the diphenols.

The aromatic polycarbonates of the present invention have weight-average molecular weights Mw (determined by gel permeation chromatography and calibration with polycarbonate calibration) of from 5000 to 200,000, preferably from 10,000 to 80,000 and particularly preferably from 15,000 to 40,000.

The polymer compositions according to the invention can optionally comprise, in addition to the components according to the invention, also further conventional polymer additives, such as, for example, the flame retardants, optical brighteners or flow improvers described in EP-A 0 839 623, WO-A 96/15102, EP-A 0 500 496 or "Plastics Additives Handbook", Hans Zweifel, 5th Edition 2000, Hanser Verlag Munich, in the amounts conventional for the thermoplastics in question.

The further polymer additives are preferably used in amounts of from 0.0 wt. % to 5.0 wt. %, more preferably from 0.01 wt. % to 1.00 wt. %, in each case based on the amount of the total polymer compositions. Mixtures of several additives are also suitable.

Component B)

UV stabilisers within the scope of the present invention have as low a transmission as possible below 400 nm and as high a transmission as possible above 400 nm. Ultraviolet absorbers that are particularly suitable for use in the composition according to the invention are benzotriazoles, triazines, benzophenones and/or arylated cyanoacrylates.

Particularly suitable ultraviolet absorbers are hydroxybenzotriazoles, such as 2-(3',5'-bis-(1,1-dimethylbenzyl)-2'-hydroxy-phenyl)-benzotriazole (Tinuvin® 234, BASF, Ludwigshafen), 2-(5-chloro-2H-benzotriazol-2-yl)-6-(1,1-dimethylethyl)-4-methyl-phenol (Tinuvin® 326, BASF, Ludwigshafen), 2-(2'-hydroxy-5'-(tert-octyl)-phenyl)-benzotriazole (Tinuvin® 329, BASF, Ludwigshafen), 2-(2'-hydroxy-3'-(2-butyl)-5'-(tert-butyl)-phenyl)-benzotriazole (Tinuvin® 350, BASF, Ludwigshafen), bis-(3-(2H-benztriazolyl)-2-hydroxy-5-tert-octyl)methane (Tinuvin®(360, BASF, Ludwigshafen), (2-(4,6-diphenyl-1,3,5-triazin-2-yl)-5-(hexyloxy)-phenol (Tinuvin® 1577, BASF, Ludwigshafen), as well as the benzophenones 2,4-dihydroxy-benzophenone (Chimasorb® 22, BASF, Ludwigshafen) and 2-hydroxy-4-(octyloxy)-benzophenone (Chimassorb® 81, Ciba, Basel), 2-propenoic acid, 2-cyano-3,3-diphenyl-2,2-bis[[(2-cyano-1-oxo-3,3-diphenyl-2-propenyl)oxy]-methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, BASF, Ludwigshafen) or tetra-ethyl-2,2'-(1,4-phenylene-dimethylidene)-bismalonate (Hostavin® B-Cap, Clariant AG).

Particularly preferred specific UV stabilisers are, for example, Tinuvin® 360, Tinuvin® 350, Tinuvin® 329, Tinuvin® 326, Hostavin® B-CAP and, of these, particularly preferably Tinuvin® 329, 326 and 360 and mixtures thereof.

Mixtures of these ultraviolet absorbers can also be used.

Component C)

The demoulding agents C) that are optionally used are esters of aliphatic long-chained carboxylic acids with mono- or poly-valent aliphatic and/or aromatic hydroxy compounds. Aliphatic carboxylic acid esters that are particularly preferably used are compounds of the general formula (III):

$$(R_4\text{---CO---O})_o\text{---}R_5\text{---(OH)}_p \quad (III)$$

where o=from 1 to 4 and p=from 3 to 0 wherein R4 is an aliphatic saturated or unsaturated, linear, cyclic or branched alkyl radical and R5 is an alkylene radical of a mono- to tetrahydric aliphatic alcohol R5-(OH)o+p.

C1-C18-Alkyl radicals are particularly preferred for R4. C1-C18-Alkyl represents, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl or 1-ethyl-2-methylpropyl, n-heptyl and n-octyl, pinacyl, adamantyl, the isomeric menthyls, n-nonyl, n-decyl, n-dodecyl, n-tridecyl, n-tetradecyl, n-hexadecyl or n-octadecyl.

Alkylene represents a straight-chained, cyclic, branched or unbranched C1-C18-alkylene radical. C1-C18-Alkylene represents, for example, methylene, ethylene, n-propylene, isopropylene, n-butylene, n-pentylene, n-hexylene, n-heptylene, n-octylene, n-nonylene, n-decylene, n-dodecylene, n-tridecylene, n-tetradecylene, n-hexadecylene or n-octadecylene.

In the case of esters of polyhydric alcohols, free, non-esterified OH groups can also be present. Aliphatic carboxylic acid esters that are suitable according to the invention are, for example: glycerol monostearate, palmityl palmitate and stearyl stearate. It is also possible to use mixtures of different carboxylic acid esters of formula (III). Carboxylic acid esters that are preferably used are esters of pentaerythritol, glycerol, trimethylolpropane, propanediol, stearyl alcohol, cetyl alcohol or myristyl alcohol with myristic, palmitic, stearic or montanic acid and mixtures thereof. Particular preference is given to pentaerythritol tetrastearate, glycerol monostearate, stearyl stearate and propanediol stearate and mixtures thereof, and most particular preference is given to pentaerythritol tetrastearate.

Component D)

Materials based on finely divided borides, such as, for example, lanthanum hexaboride, have become established as inorganic IR absorbers because they have a broad absorption band. Such borides based on La, Ce, Pr, Nd, Tb, Dy, Ho, Y, Sm, Eu, Er, Tm, Yb, Lu, Sr, Ti, Zr, Hf, V, Ta, Cr, Mo, W and Ca are described, for example, in DE 10392543 or EP 1 559 743.

Also known are IR-absorbing additives from the group of the tungsten compounds, which have a lower intrinsic absorption in the visible spectral range as compared with the boride-based inorganic IR absorbers known from the prior art, preference being given in particular to the use of zinc-doped tungsten compounds having increased long-term stability.

Among the inorganic IR absorbers, particular preference is given to borides, here most particularly lanthanum hexaboride, tungstates, in this case in particular caesium tungstates as well as zinc-doped caesium tungstates, tin oxides, in particular indium tin oxide (ITO), as well as tin-doped antimony oxide (ATO).

The preparation and use of these absorbers in thermoplastic materials is described, for example, in H. Takeda, K. Adachi, J. Am. Ceram. Soc. 90, 4059-4061, (2007), WO 2005037932, JP 2006219662, JP 2008024902, JP 2008150548, WO 2009/059901 and JP 2008214596.

Tungstate-based IR absorbers are preferably IR absorbers of the type b1) WyOz (W=tungsten, O=oxygen; z/y=2.20-2.99) and/or
b2) MxWyOz (M=H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi; x/y=0.001-1.000; z/y=2.2-3.0), wherein preference is given as M to the elements H, Cs, Rb, K, Tl, In, Ba, Li, Ca, Sr, Fe and Sn, of which Cs is most particularly preferred. Particular preference is given to $Ba_{0.33}WO_3$, $Tl_{0.33}WO_3$, $K_{0.33}WO_3$, $Rb_{0.33}WO_3$, $Cs_{0.33}WO_3$, $Nao_{0.33}WO_3$, $Na_{0.75}WO_3$ and mixtures thereof. In a particular embodiment of the present invention, the sole use of $Cs_3WO_3$ as inorganic IR absorber is most particularly preferred. Cs/W ratios of 0.20 and 0.25 are likewise preferred, the above-mentioned tungsten compounds of type b1) and b2) being referred to as tungstates below.

In a further preferred embodiment with doped tungstates, they are substances of the type $Zn_wM_xW_yO_z$ (M=at least one element selected from the group consisting of H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Cd, Al, Ga, In, Tl, Si, Ge, Sn, Pb, Sb, B, F, P, S, Se, Br, Te, Ti, Nb, V, Mo, Ta, Re, Be, Hf, Os, Bi; x/y=0.001-1.000; z/y=2.2-3.0; w=0.001-0.015), wherein preference is given as M to the elements H, Cs, Rb, K, Tl, In, Ba, Li, Ca, Sr, Fe and Sn, of which Cs is most particularly preferred. Also particularly preferred is zinc-doped $Ba_{0.33}WO_3$, $Tl_{0.33}WO_3$, $K_{0.33}WO_3$, $Rb_{0.33}WO_3$, $Cs_{0.33}WO_3$, $Na_{0.75}WO_3$, $Na_{0.75}WO_3$ and mixtures thereof.

If boride-based IR absorbers are used, preference is given to nano-scale inorganic IR absorber particles based on boride, preferably a metal boride, the metal being selected from the group of the following elements La, Ce, Pr, Nd, Tb, Dy, Ho, Y, Sm, Eu, Er, Tm, Yb, Lu, Sr, Ti, Zr, Hf, V, Ta, Cr, Mo, W and Ca. The hexaboride form is particularly preferred. Particular preference is given to lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride ($CrB$ and $CrB_2$), molybdenum boride ($MoB_2$, $Mo_2B_5$ and $MoB$), tungsten boride ($W_2B_5$), or combinations of these borides. Most particular preference is given to borides based on lanthanum hexaboride ($LaB_6$) or mixtures containing lanthanum hexaboride.

A further IR absorber according to the invention is titanium nitride (TiN), which is distinguished by a broadband absorption in the infrared range and by colour neutrality in the visual range. In a preferred embodiment, titanium nitride is used in conjunction with antimony tin oxide (ATO), more preferably in a ratio of from 1:50 to 1:10, preferably in a ratio of from 1:15 to 1:40. The particle diameter (determined by TEM/transmission electron microscopy) of inorganic IR absorbers is preferably smaller than 200 nm, more preferably smaller than 100 nm and yet more preferably smaller than 50 nm, the particle diameter in each case preferably being greater than 5 nm, more preferably greater than 10 nm. In a particularly preferred embodiment, the average particle diameter is from 15 nm to 25 nm. The particles are transparent in the visible range of the spectrum, transparent meaning that the absorption of the IR absorbers in the visible range of light is low compared with the absorption in the IR range and the IR absorber does not lead to markedly increased haze or markedly reduced transmission (in the visible range of light) of the composition or the end product in question.

The surface of the particles can be treated. For example, the surface can be treated with a silane or provided with a titanium-based, zirconium-based layer or similar layers. The resistance to moisture can be increased by means of this treatment. This type of coating increases the long-term stability in respect of the IR absorption and is described, for example, in US 20050161642. In a preferred embodiment, the boride- or tungstate-based IR absorber particles are coated with titanium nitride.

In the present invention, the finely divided IR absorber particles are introduced into the polymer matrix preferably in the form of a dispersion. This dispersion prevents reagglomeration and facilitates incorporation into a thermoplastic matrix such as, for example, polycarbonate. Polymer-like dispersing agents are preferably used. Suitable polymer-based dispersing agents are especially dispersing agents which have high light transmission, such as, for example, polyacrylates, polyurethanes, polyethers or polyesters as well as polymers derived therefrom. Preferred as dispersing agents are polyacrylates, polyethers and polyester-based polymers. Dispersing agents having high temperature stability are preferably used.

For the preparation of the inorganic IR absorber nanoparticles according to the invention, the IR absorber can be mixed with the dispersing agents described below and further organic solvents, such as, for example, toluene, benzene or similar aromatic hydrocarbons, and ground in suitable mills, such as, for example, ball mills, with the addition of zirconium oxide (e.g. having a diameter of 0.3 mm), in order to produce the desired particle size distribution. The nanoparticles are obtained in the form of a dispersion. After grinding, further dispersing agents can optionally be added. The solvent is removed at elevated temperatures and reduced pressure.

The size of the particles can be determined by means of transmission electron microscopy (TEM). Such measurements on IR absorber nanoparticles are described, for example, in Adachi et al., J. Am. Ceram. Soc. 2008, 91, 2897-2902.

For use in transparent thermoplastics, the particles so obtained are dispersed in an organic matrix, for example in an acrylate, and optionally ground as described above in a mill using suitable auxiliary substances such as, for example, zirconium dioxide and optionally using organic solvents such as, for example, toluene, benzene or similar hydrocarbons.

Suitable polymer-based dispersing agents are especially dispersing agents which have high light transmission, such as, for example, polyacrylates, polyurethanes, polyethers, polyesters or polyester urethanes as well as polymers derived therefrom.

Preferred dispersing agents are polyacrylates, polyethers and polyester-based polymers, particular preference being given, as dispersing agents having high temperature stability, to polyacrylates, such as, for example, polymethyl methacrylate or polymethyl acrylate (together known as polymethyl (meth)acrylate), and polyesters. Mixtures of these polymers or also acrylate-based copolymers can also be used. Such dispersing aids and methods for the preparation of tungstate dispersions are described, for example, in JP 2008214596 and in Adachi et al. J. Am. Ceram. Soc. 2007, 90 4059-4061.

Dispersing agents suitable for the present invention are obtainable commercially. Polyacrylate-based dispersing agents are particularly suitable. Such suitable dispersing agents are obtainable, for example, from BASF Ludwigshafen under the trade name EFKA®, for example EFKA® 4500 and EFKA® 4530. Polyester-containing dispersing agents are likewise suitable. They are obtainable, for example, from Avecia under the trade name Solsperse®, for example Solspersea 22000, 24000SC, 26000, 27000. Polyether-containing dispersing agents are also known, for example under the trade names Disparlon® DA234 and DA325 from Kusumoto Chemicals. Polyurethane-based systems are also suitable. Polyurethane-based systems are obtainable from BASF Ludwigshafen under the trade names EFKA® 4046, EFKA® 4047. Texaphoro® P60 and P63 are corresponding trade names of Cognis.

The amount of IR absorber in the dispersing agent is from 0.2 wt. % to 80.0 wt. %, preferably from 1.0 wt. % to 40.0 wt. %, more preferably from 5 wt. % to 35 wt. % and most preferably from 10 wt. % to 30 wt. %, based on the dispersion of the inorganic IR absorber used according to the invention. The total composition of the ready-to-use IR absorber formulation can comprise, in addition to the pure IR absorber substance and the dispersing agent, also further auxiliary substances such as, for example, zirconium dioxide, as well as residual solvents such as, for example, toluene, benzene or similar aromatic hydrocarbons.

Compounds such as indium oxide doped with from 2 to 30 atom %, preferably from 4 to 12 atom % tin (ITO) or with from 10 to 70 atom % fluorine can further be added.

Particular preference is given to the combination with tin oxide as a further IR absorber, which is doped with from 2 to 60 atom % antimony (ATO) or with from 10 to 70 atom % fluorine.

Zinc oxide doped with from 1 to 30 atom %, preferably with from 2 to 10 atom % aluminium or with from 2 to 30 atom % indium or with from 2 to 30 atom % gallium is also particularly preferred.

Mixtures of the above-mentioned infrared absorbers are particularly suitable because the person skilled in the art, by means of a purposive selection, can optimise the absorption in the near-infrared range.

Particular preference is given to the use of mixtures of $LaB_6$ with caesium tungstate, TiN with caesium tungstate, $LaB_6$ with antimony tin oxide and caesium tungstate with antimony tin oxide.

The ratio of $LaB_6$ to caesium tungstate is preferably from 1:6 to 1:12, more preferably from 1:8 to 1:10.

The ratios are based in each case on the solids content of the pure IR absorber.

Component E)

Suitable additional organic infrared absorbers are described according to substance classes, for example, in M. Matsuoka, Infrared Absorbing Dyes, Plenum Press, New York, 1990. Particularly suitable are infrared absorbers from the classes of the phthalocyanines, the naphthalocyanines, the metal complexes, the azo dyes, the anthraquinones, the quadratic acid derivatives, the immonium dyes, the perylenes, the quaterylenes and the polymethines.

Of those, quaterylenes, perylenes, phthalocyanines and naphthalocyanines are most particularly suitable.

On account of the improved solubility in thermoplastics, preference is to be given to phthalocyanines and naphthalocyanines with sterically demanding side groups, such as, for example, phenyl, phenoxy, alkylphenyl, alkylphenoxy, tert-butyl, (—S-phenyl), —NH-aryl, —NH-alkyl and similar groups.

Particular preference is given to Lumogen IR 765 (CAS No. 943969-69-5; EG No. 454-270-3), Lumogen IR 788 (EG No. 451-660-5/CAS No. 333304-54-4) from BASF Ludwigshafen as well as Excolor HA 1 ((octaanilinooctafluorophthalocyanato)oxovanadium) from Nippon Shokubai.

Component F)

Carbon black according to the present invention is a black pulverulent solid which, depending on its quality and use, consists substantially of carbon. The carbon content of carbon black is generally from 80.0 to 99.9 wt. %. In carbon blacks that have not been subjected to oxidative aftertreatment, the carbon content is preferably from 96.0 to 95.5 wt. %. Traces of organic impurities on the carbon black can be removed by extracting the carbon black with organic solvents, for example with toluene, and the carbon content can thus be increased to even greater than 99.9 wt. %. In carbon blacks that have been subjected to oxidative aftertreatment, the oxygen content can be up to 30 wt. %, preferably up to 20 wt. %, in particular from 5 to 15 wt. %.

Carbon black consists of mostly spherical primary particles having a size of preferably from 10 to 500 nm. These primary particles have grown together to form chain-like or branched aggregates. The aggregates are generally the smallest unit into which the carbon black can be broken in a dispersing process. Many of these aggregates combine again by intermolecular (van der Waals) forces to form agglomerates. Both the size of the primary particles and the aggregation (structure) thereof can purposively be adjusted by varying the preparation conditions. The term structure is understood by the person skilled in the art as meaning the nature of the three-dimensional arrangement of the primary particles in an aggregate. The term "high structure" is used for carbon blacks having highly branched and crosslinked aggregate structures; "low structure", on the other hand, refers to largely linear aggregate structures, that is to say those with little branching and crosslinking.

The oil adsorption number, measured according to ISO 4656 with dibutyl phthalate (DBP), is generally given as a measure of the structure of a carbon black. A high oil adsorption number is indicative of a high structure.

The primary particle size of a carbon black can be determined, for example, by means of scanning electron microscopy. However, the BET surface area of a carbon black, determined according to ISO 4652 with nitrogen adsorption, is also used as a measure of the primary particle size of the carbon black. A high BET surface area is indicative of a small primary particle size.

The dispersibility of the agglomerates of a carbon black depends on the primary particle size and the structure of the aggregates, the dispersibility of the carbon black generally decreasing as the primary particle size and the structure decrease.

As an industrial product, industrial carbon black is produced by incomplete combustion or pyrolysis of hydrocarbons. Processes for producing industrial carbon black are known in the literature. Known processes for producing industrial carbon blacks are in particular the furnace, gas black, flame black, acetylene black and thermal black processes.

The particle size distribution of the primary particles, as well as the size and structure of the primary particle aggregates, determine properties such as colour depth, base tone and conductivity of the carbon black. Conductive blacks generally have small primary particles and widely branched aggregates. Colour carbon blacks are generally carbon blacks having very small primary particles and are often subjected to subsequent oxidation by one of the abovementioned processes after they have been produced. The oxidic groups thereby attached to the carbon black surface are to increase the compatibility with the resins in which the colour carbon blacks are to be introduced and dispersed.

Colour carbon blacks are preferably used. In a preferred embodiment, they have a mean primary particle size, determined by scanning electron microscopy, of less than 100 nm, preferably from 10 to 99 nm, more preferably from 10 to 50 nm, particularly preferably from 10 to 30 nm, in particular from 10 to 20 rm. The particularly finely divided colour carbon blacks are therefore particularly preferred in the process according to the invention because the colour depth and UV resistance achievable with a specific amount of carbon black increases as the primary particle size falls; on the other hand, however, their dispersibility also falls, which is why such very finely divided carbon blacks in particular are in need of improvement in respect of dispersibility.

The colour carbon blacks which are preferably used have a BET surface area, determined according to ISO 4652 by nitrogen adsorption, of preferably at least 20 m$^2$/g, more preferably at least 50 m$^2$/g, particularly preferably at least 100 m$^2$/g, in particular at least 150 m$^2$/g.

Colour carbon blacks which are preferably used are additionally characterised by an oil adsorption number, measured according to ISO 4656 with dibutyl phthalate (DBP), of preferably from 10 to 200 ml/100 g, more preferably from 30 to 150 ml/100 g, particularly preferably from 40 to 120 ml/100 g, in particular from 40 to 80 ml/100 g. The colour carbon blacks having a low oil adsorption number generally achieve a better colour depth and are preferred in that respect but, on the other hand, they are generally more difficult to disperse, which is why such carbon blacks in particular are in need of improvement in respect of dispersibility.

The carbon blacks which are used can be and are preferably used in pelletised or pearl form. Pearling or pelletisation is carried out by processes known in the literature and on the one hand is used to increase the bulk density and improve the metering (flow) properties, but on the other hand is also carried out for reasons of hygiene in the workplace. The hardness of the pellets or pearls is preferably so adjusted that they withstand transportation and feeding processes during metering largely undamaged, but break up completely into agglomerates again when subjected to greater mechanical shear forces as are encountered, for example, in commercial powder mixing devices and/or compounding units.

Carbon blacks which are obtainable commercially and are suitable within the scope of the invention are obtainable under a large number of trade names and in a large number of forms, such as pellets or powders. For example, suitable carbon blacks are obtainable under the trade name BLACK PEARLS®, in the form of wet-processed pellets under the names ELFTEX®, REGAL® and CSX®, and in a flocculent form under the names MONARCH®, ELFTEX®, REGAL® and MOGUL®—all obtainable from Cabot Corporation.

Particular preference is given to carbon blacks which are marketed under the trade name BLACK PEARLS® (CAS No. 1333-86-4).

In addition to their colouring action, carbon blacks within the context of the present invention are also to be understood as being IR absorbers.

The IR absorbers, particularly preferably inorganic IR absorbers, can also be used in the form of mixtures with one another. Thus, in the case of mixtures, preference is given to compositions which comprise from two up to and including five, and particularly preferably two or three, different IR absorbers.

The IR absorbers can be so combined that a maximum absorption range is covered by the maxima of the individual IR absorbers.

These concentrations are preferably used for finished parts having thicknesses of from 0.5 mm to 8 mm, preferably from 0.8 mm to 6.0 mm and particularly preferably from 1.0 mm to 4.0 mm.

In further particular embodiments, in particular for applications in railway vehicles and aircraft, the thickness of the glazing can also be more than 8 mm, preferably from 9 mm to 15 mm, the concentration of the corresponding IR absorbers and stabilisers here being adjusted accordingly.

In a further preferred embodiment, the additional IR absorber(s) has/have an absorption spectrum that differs from that of the boride or tungstate used, based on the absorption maxima, so that a maximum absorption range is covered by the maxima.

Component G)

The compositions of the present invention further comprise at least one heat stabiliser selected from the group comprising phosphine-based stabilisers, phosphite-based stabilisers and stabilisers from the group of the phenolic antioxidants.

There are no limitations regarding the choice of phosphines, the phosphine compounds preferably being selected from the group comprising aliphatic phosphines, aromatic phosphines and aliphatic-aromatic phosphines.

The phosphine compounds can be primary, secondary and tertiary phosphines. Tertiary phosphines are preferably used, aromatic phosphines being particularly preferred and tertiary aromatic phosphines being most particularly preferred.

In a preferred embodiment of the present invention there are used triphenylphosphine (TPP), trialkylphenylphosphine, bisdiphenylphosphinoethane or a trinaphthylphosphine as well as Irgaphos 168, of which triphenylphosphine (TPP) is most particularly preferred, or mixtures of these phosphines.

Mixtures of different phosphines can in principle be used.

The preparation and properties of phosphine compounds are known to the person skilled in the art and are described, for example, in EP-A 0 718 354 and "Ullmanns Enzyklopädie der Technischen Chemie", 4th Edition, Vol. 18, p. 378-398 and Kirk-Othmer, 3rd Edition, Vol. 17, p. 527-534.

In the case of the amount of phosphine compound used in the stabiliser mixture, account is to be taken of the fact that the substance is oxidised under particular processing conditions in dependence on temperature and residence time. The oxidised portion is no longer available for stabilising the IR absorbers used. Therefore, the number of processing steps and the process conditions are to be taken into consideration. The composition accordingly always comprises specific amounts of oxidised phosphine, particularly preferably triphenylphosphine oxide, after thermal processing.

Heat and processing stabilisers suitable within the context of the present invention are phosphites and phosphonites as well as phosphines. Examples are triphenyl phosphite, diphenylalkyl phosphite, phenyldialkyl phosphite, tris(nonylphenyl) phosphite, trilauryl phosphite, trioctadecyl phosphite, distearylpentaerythritol diphosphite, tris(2,4-di-tert-butylphenyl) phosphite, diisodecyl-pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)-pentaerythritol diphosphite, bis(2,4,6-tris(tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1, 3,2-dioxaphosphocine, bis(2,4-di-tert-butyl-6-methylphenyl)methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocine, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl- 4-methylphenyl)pentaerythritol diphosphite, triphenylphosphine (TPP), trialkylphenylphosphine, bisdiphenylphosphinoethane or trinaphthylphosphine. Particular preference is given to the use of triphenylphosphine (TPP), Irgafos® 168 (tris(2,4-di-tert-butyl-phenyl) phosphite) and tris(nonylphenyl) phosphite or mixtures thereof.

Phenolic antioxidants such as alkylated monophenols, alkylated thioalkylphenols, hydroquinones and alkylated hydroquinones can further be used. Particular preference is given to the use of Irganox® 1010 (pentaerythritol-3-(4-hydroxy-3,5-di-tert-butylphenyl) propionate; CAS: 6683-19-8) and Irganox 1076® (2,6di-tert-butyl-4(octadecanoxycarbonylethyl)phenol).

It is also possible within the context of the present invention to use combinations of the stabilisers listed above, in particular a combination of TPP and Irganox® 1076, more preferably in the ratio 1:1.

Component H)

Suitable flame retardants within the scope of the present invention are inter alia alkali and alkaline earth salts of aliphatic and aromatic sulfonic acid, sulfonamide and sulfonimide derivatives, for example potassium perfluorobutanesulfonate, potassium diphenylsulfonesulfonate, N-(p-tolylsulfonyl)-p-toluenesulfimide potassium salt, N—(N'-benzylaminocarbonyl)-sulfanylimide potassium salt.

Salts which can optionally be used in the moulding compositions according to the invention are, for example: sodium or potassium perfluorobutane sulfate, sodium or potassium perfluoromethanesulfonate, sodium or potassium perfluorooctane sulfate, sodium or potassium 2,5-dichlorobenzene sulfate, sodium or potassium 2,4,5-trichlorobenzane sulfate, sodium or potassium methylphosphonate, sodium or potassium (2-phenyl-ethylene)-phosphonate, sodium or potassium pentachlorobenzoate, sodium or potassium 2,4,6-trichlorobenzoate, sodium or potassium 2,4-dichlorobenzoate, lithium phenylphosphonate, sodium or potassium diphenylsulfonesulfonate, sodium or potassium 2-formylbenzenesulfonate, sodium or potassium (N-benzenesulfonyl)-benzenesulfonamide, trisodium or tripotassium hexafluoroaluminate, disodium or dipotassium hexafluorotitanate, disodium or dipotassium hexafluorosilicate, disodium or dipotassium hexafluorozirconate, sodium or potassium pyrophosphate, sodium or potassium metaphosphate, sodium or potassium tetrafluoroborate, sodium or potassium hexafluorophosphate, sodium or potassium or lithium phosphate, N-p-tolylsulfonyl)-p-toluenesulfimide potassium salt, N—(N'-benzylaminocarbonyl)-sulfanylimide potassium salt.

Preference is given to sodium or potassium perfluorobutanesulfonate, sodium or potassium perfluorooctane sulfate, sodium or potassium diphenylsulfonesulfonate and sodium or potassium 2,4,6-trichlorobenzoate and N-(p-tolylsulfonyl)-p-toluenesulfimide potassium salt, N—(N'-benzylaminocarbonyl)-sulfanylimide potassium salt. Most particular preference is given to potassium nona-fluoro-1-butanesulfonate and sodium or potassium diphenylsulfonesulfonate. Potassium nona-fluoro-1-butanesulfonate is obtainable commercially inter alia as Bayowet®C4 (Lanxess, Leverkusen, Germany, CAS No. 29420-49-3), RM64 (Miteni, Italy) or as 3M™ Perfluorobutanesulfonyl Fluoride FC-51 (3M, USA). Mixtures of the mentioned salts are likewise suitable.

Within the context of the present invention, the above-mentioned flame retardants are preferably used in amounts of from 0.00 wt. % to 0.15 wt. %, preferably from 0.001 to 0.1300 wt. %, more preferably from 0.010 to 0.100 wt. %, particularly preferably from 0.020 to 0.070 wt. %, of at least one flame retardant.

Examples of suitable alternative flame retardants are phosphorus-containing flame retardants selected from the groups of the monomeric and oligomeric phosphoric and phosphonic acid esters, phosphonate amines, phosphonates, phosphinates, phosphites, hypophosphites, phosphine oxides and phosphazenes, it also being possible to use as flame retardants mixtures of a plurality of components selected from one or various of these groups. Other, preferably halogen-free phosphorus compounds not mentioned specifically here can also be used on their own or in an arbitrary combination with other, preferably halogen-free phosphorus compounds. These also include purely inorganic phosphorus compounds such as boron phosphate hydrate. Phosphonate amines also come into consideration as phosphorus-containing flame retardants. The preparation of phosphonate amines is described, for example, in U.S. Pat. No. 5,844,028. Phosphazenes and their preparation are described, for example, in EP A 728 811, DE A 1 961668 and WO 97/40092. Siloxanes, phosphorylated organosiloxanes, silicones or siloxysilanes can also be used as flame retardants, which is described in greater detail, for example, in EP 1 342 753, in DE 10257079A and in EP 1 188 792.

Bisphenol A diphosphate can further be used as an alternative flame retardant; it is obtainable commercially inter alia as Reofos® BAPP (Chemtura, Indianapolis, USA), NcendX® P-30 (Albemarle, Baton Rouge, La., USA), Fyrolflex® BDP (Akzo Nobel, Arnheim, Netherlands) or CR 741® (Daihachi, Osaka, Japan).

Further phosphoric acid esters which can be used as additional flame retardants within the context of the present invention are additionally triphenyl phosphate, which is supplied inter alia as Reofos® TPP (Chemtura), Fyrolflex® TPP (Akzo Nobel) or Disflamoll® TP (Lanxess), and resorcinol diphosphate. Resorcinol diphosphate can be obtained commercially as Reofos RDP (Chemtura) or Fyrolflex® RDP (Akzo Nobel).

Within the context of the present invention, the phosphorus compounds are preferably additionally used in amounts of from 1 wt. % to 7 wt. %, preferably from 1 wt. % to 6 wt. %, particularly preferably from 2 wt. % to 6 wt. %, in each case based on the total composition.

Within the scope of the present invention, further suitable alternative or additional flame retardants to those mentioned above are halogen-containing compounds. These include brominated compounds such as brominated oligocarbonates (e.g. tetrabromobisphenol A oligocarbonate BC-52®, BC-58®, BC-52HP® from Chemtura), polypentabromobenzyl acrylates (e.g. FR 1025 from Dead Sea Bromine (DSB)), oligomeric reaction products of tetrabromo-bisphenol-A with epoxides (e.g. FR 2300 and 2400 from DSB), or brominated oligo- and poly-styrenes (e.g. Pyro-Chek® 68PB from Ferro Corporation, PDBS 80 and Firemaster® PBS-64HW from Chemtura).

Within the context of the present invention, additional bromine-containing compounds are used in amounts of from 0.01 wt. % to 5.00 wt. %, preferably from 0.1 wt. % to 3.0 wt. %, particularly preferably from 0.5 wt. % to 2.0 wt. %.

Component I)

The composition can comprise as further commercially available additives according to component 1) flow agents, nucleating agents, stabilisers, antistatics (for example conductive blacks, carbon fibres, carbon nanotubes as well as organic antistatics such as polyalkylene ethers, alkylsulfonates or polyamide-containing polymers), acids. Such compounds are described, for example, in the appropriate chapters of the "Plastics Additives Handbook", ed. Hans Zweifel, 5th Edition 2000, Hanser Publishers, Munich.

Component K)

Examples of organic pigments which can be used as additives for dyeing are anthraquinone, azo, azomethine, benzanthrone, quinacridone, quinophthalone, dioxazine, flavanthrone, indanthrone, isoindoline, isoindolinone, methine, perinone, perylene, phthalocyanine, pyranthrone, pyrrolopyrrole, thioindigo pigments, as well as metal complexes of, for example, azo, azomethine, methine dyes or metal salts of azo compounds.

There are suitable as polymer-soluble dyes, for example, dispersion dyes, such as those of the anthraquinone series, for example alkylamino-, amino-, arylamino-, cyclohexylamino-, hydroxy-, hydroxyamino- or phenylmercapto-anthraquinones, as well as metal complexes of azo dyes, in particular 1:2 chromium or cobalt complexes of monoazo dyes, as well as fluorescent dyes, for example those of the benzthiazole, coumarin, oxarin or thiazine series.

The compositions of the present invention preferably comprise at least one dye selected from the group comprising:
a) Macrolex Violet 3R (CAS No. 0000082-16-6), 1,8-bis((4-methylphenyl)amino)-9,10-anthracenedione, MW: 418.494
b) Macrolex Yellow 3G (CAS No. 004174-09-8), MW: 358.3992,
c) Macrolex Blue RR (CAS No. 032724-62-2), 1,4-bis((2,6-diethyl-4-methylphenyl)amino)-9,10-anthracenedione, MW: 530.708,
d) Heliogen Blue K6911 D (CAS No. 000147-14-8), copper phthalocyanine,
e) Macrolex Orange 3G (CAS No. 006925-69-5), MW: 270.29,
f) Makrolex Violet B (CAS No. 81-48-1).

Dyes a, f and d are more preferably used, particularly preferably in a combination of a and/or f with d, and most particularly preferably in a ratio of from 1:1 to 1:6 of a and/or f to b.

Methods for the preparation of the polymer compositions according to the invention are known to the person skilled in the art.

The preparation of the polymer compositions according to the invention comprising components a) to k) is carried out by conventional incorporation processes by combining, mixing and homogenising the components, the homogenisation in particular preferably being carried out in the melt under the action of shear forces. Combining and mixing prior to melt homogenisation are optionally carried out using powder premixtures.

It is also possible to use premixtures which have been prepared from solutions of the mixture components in suitable solvents, homogenisation optionally being carried out in solution and the solvent subsequently being removed.

In particular, the components of the composition according to the invention can be introduced by known methods, such as, inter alia, in the form of a masterbatch.

The use of masterbatches and of powder mixtures or compacted premixtures is suitable in particular for the introduction of components b) up to and including k).

Particularly preferably, components b), c), e), g) and h) are incorporated in the form of a powder mixture, the powder mixture additionally containing pulverulent component a).

In a particular embodiment, the above-mentioned components can be metered into a masterbatch, preferably components d) and f) in a) as carrier material, mixing preferably taking place in the melt under the action of shear forces (for example in a kneader or twin-screw extruder). This process offers the advantage that the components are better distributed in the polymer matrix. For the preparation of the masterbatch there is preferably chosen as the polymer matrix the thermoplastic plastic that also represents the main component of the final polymer composition as a whole.

In this connection, the composition can be combined, mixed, homogenised and then extruded in conventional devices such as screw-type extruders (for example twin-screw extruder, TSE), kneaders, Brabender or Banbury mills. After the extrusion, the extrudate can be cooled and comminuted. It is also possible for individual components to be premixed and the remaining starting materials subsequently to be added separately and/or likewise as a mixture.

The polymer compositions according to the invention can be processed to products or moulded bodies by, for example, first extruding the polymer compositions as described to form a granulate and processing the granulate by suitable processes into various products or moulded bodies in known manner.

In this connection, the compositions according to the invention can be converted, for example, by means of hot pressing, spinning, blow moulding, deep drawing, extrusion or injection moulding into products, moulded bodies or moulded objects. The use of multi-layer systems is also of interest. Application can take place at the same time as or immediately after moulding of the base body, for example by coextrusion or multi-component injection moulding. However, application can also be to the finished moulded base body, for example by lamination with a film or by coating with a solution.

Sheets of a base layer and optional top layer/layers (multi-layer systems) can be produced by (co)extrusion, direct skinning, direct coating, insert moulding, film insert moulding, or other suitable processes known to the person skilled in the art.

For extrusion, the polymer composition, which has optionally been pretreated, for example by means of drying, is fed to the extruder and melted in the plastification system of the extruder. The plastics melt is then pressed through a flat die or multi-wall sheet die and thereby shaped, is brought to the desired final form in the roll gap of a smoothing calender, and its shape is fixed by alternate cooling on smoothing rollers and with ambient air. The temperatures necessary for extrusion of the polymer composition are set, it usually being possible to follow the manufacturers instructions. If the polymer compositions comprise, for example, polycarbonates having a high melt viscosity, they are normally processed at melt temperatures of from 260° C. to 350° C., and the cylinder temperatures of the plastification cylinder and the die temperatures are set accordingly.

By using one or more side extruders and a multiple manifold die or optionally suitable melt adapters upstream of a flat die it is possible to lay thermoplastic melts of different compositions above one another and accordingly produce multi-layer sheets or films (for coextrusion see, for example, EP-A 0 110 221, EP-A 0 110 238 and EP-A 0 716 919, for details of the adapter and die process see Johannaber/Ast: "Kunststoff-Maschinenführer", Hanser Verlag, 2000 and Gesellschaft Kunststofftechnik: "Coextrudierte Folien und Platten: Zukunftsperspektiven, Anforderungen, Anlagen und Herstellung, Qualitätssicherung", VDI-Verlag, 1990).

Using the above-described thermoplastic substrates, moulded bodies can also be produced by injection moulding. The processes therefor are known and are described in "Handbuch Spritzgiessen", Friedrich Johannaber/Walter Michaeli, Munich; Vienna: Hanser, 2001, ISBN 3-446-15632-1 or "Anleitung zum Bau von Spritzgiesswerkzeugen", Menges/Michaeli/Mohren, Munich; Vienna: Hanser, 1999, ISBN 3-446-21258-2.

Preferred products, moulded bodies or moulded objects according to the invention are sheets, films, glazing, for example aircraft, car sunroofs, safety glazing, roof coverings or glazing for buildings, visors, spectacles. In addition to solid sheets, it is also possible to use twin-wall sheets or multi-wall sheets. In addition to the compositions according to the invention, further material components, for example, can be present in the products according to the invention as further components of the products according to the invention. For example, glazing can have sealing materials at the edges of the glazing. Roof coverings can have, for example, metal components such as screws, metal pins or the like, which can be used to secure or guide (in the case of folding or sliding roofs) the roofing elements. Further materials can also be joined with the compositions according to the invention, for example by 2-component injection moulding. For example, the corresponding structural element having IR-absorbing properties can be provided with an edge which is used, for example, for adhesive bonding.

In a particular embodiment, the articles produced from the composition of the present invention are coated. This coating serves to protect the thermoplastic material against general weathering influences (e.g. damage by sunlight) as well as against mechanical damage to the surface (e.g. scratching) and accordingly increases the resistance of the correspondingly equipped articles. A coating can also reduce the tendency to fogging, which is of interest in particular in the case of spectacles and visors.

It is known that polycarbonate can be protected against UV radiation by means of various coatings. Such coatings conventionally contain UV absorbers. Such layers likewise increase the scratch resistance of the corresponding article. The articles of the present invention can carry single-layer or multi-layer systems. They can be coated on one side or on both sides. In a preferred embodiment, the article comprises a scratch-resistant lacquer comprising UV absorber. In a particular embodiment, the multi-layer product comprises at least one layer comprising the composition according to the invention, at least one anti-UV layer and optionally a scratch-resistant coating.

In the case of glazing materials, the article carries at least one scratch-resistant or anti-reflection coating on at least one side.

The preparation of the coating, for example an anti-reflection coating, can be carried out by various methods. For example, coating can be carried out by various methods of vapour deposition, for example by electron beam processes, resistance heating and by plasma deposition or various sputtering methods such as high-frequency sputtering, magnetron sputtering, ion beam sputtering, etc., ion plating by means of DC, RF, HCD methods, reactive ion plating, etc. or chemical gas-phase deposition. An anti-reflection coating can also be applied from solution. Accordingly, a corresponding coating solution can be prepared via a dispersion of a metal oxide having a high refractive index, such as $ZrO_2$, $TiO_2$, $Sb_2O_5$ or $WO_3$, in a silicon-based lacquer, which coating solution is suitable for the coating of plastics articles and can be cured thermally or with UV assistance.

Various methods are known for producing a scratch-resistant coating on plastics articles. For example, lacquers based on epoxy, acrylic, polysiloxane, colloidal silica gel or inorganic/organic materials (hybrid systems) can be used. Such systems can be applied, for example, by dipping processes, spin coating, spraying processes or flow coating. Curing can be carried out thermally or by means of UV radiation. Single- or multi-layer systems can be used. The scratch-resistant coating can be applied, for example, directly or after preparation of the substrate surface with a primer. Furthermore, a scratch-resistant coating can be applied by plasma-assisted polymerisation processes, for example via an $SiO_2$ plasma. Anti-fog or anti-reflection coatings can likewise be produced by plasma processes. It is further possible to apply a scratch-resistant coating to the resulting moulded body by means of specific injection-moulding processes, such as, for example, the back-injection of surface-treated films. Various additives, such as, for example, UV absorbers derived, for example, from triazoles or triazines, can be present in the scratch-resistant coating. IR absorbers of organic or inorganic nature can further be present Such additives can be contained in the scratch-resistant lacquer itself or in the primer layer. The thickness of the scratch-resistant layer is from 1 to 20 µm, preferably from 2 to 15 µm. Below 1 µm, the resistance of the scratch-resistant layer is unsatisfactory. Above 20 µm, cracks occur more frequently in the lacquer. The base material according to the invention, which is described in the present invention, is preferably provided with an above-described scratch-resistant and/or anti-reflection layer after the injection-moulded article has been produced, because the preferred field of use is in the window or automotive glazing sector.

For polycarbonates, a primer comprising UV absorber is preferably used in order to improve the adhesion of the scratch-resistant lacquer. The primer can comprise further stabilisers such as, for example, HALS systems (stabilisers based on sterically hindered amines), adhesion promoters, flow improvers. The resin in question can be selected from a large number of materials and is described, for example, in Ullmann's Encyclopedia of Industrial Chemistry, 5th Edition, Vol. A 18, pp. 368-426, VCH, Weinheim 1991. Polyacrylates, polyurethanes, phenol-based, melamine-based, epoxy and alkyd systems, or mixtures of these systems, can be used. The resin is in most cases dissolved in suitable solvents—frequently in alcohols. Depending on the chosen resin, curing can take place at room temperature or at elevated temperatures. Temperatures of from 50° C. to 130° C. are preferably used—frequently after a large proportion of the solvent has briefly been removed at room temperature. Commercially obtainable systems are, for example, SHP470, SHP470FT and SHP401 from Momentive Performance Materials. Such coatings are described, for example, in U.S. Pat. No. 6,350,512 B1, 5,869,185, EP 1308084, WO 2006/108520.

Scratch-resistant lacquers (hard-coat) are preferably composed of siloxanes and preferably contain UV absorbers. They are preferably applied by dipping or flow processes. Curing takes place at temperatures of from 50° C. to 130° C. Commercially obtainable systems are, for example, AS4000, SHC5020 and AS4700 from Momentive Performance Materials. Such systems are described, for example, in U.S. Pat. No. 5,041,313, DE 3121385, U.S. Pat. No. 5,391,795, WO 2008/109072. The synthesis of these materials is in most cases carried out by condensation of alkoxy- and/or alkylalkoxy-silanes with acid or base catalysis. Nanoparticles can optionally be incorporated. Preferred solvents are alcohols such as butanol, isopropanol, methanol, ethanol and mixtures thereof.

Instead of primer/scratch-resistant coating combinations, one-component hybrid systems can be used. These are described, for example, in EP0570165 or WO 2008/071363 or DE 2804283. Commercially obtainable hybrid systems are obtainable, for example, under the names PHC587 or UVHC 3000 from Momentive Performance Materials.

In a particularly preferred process, application of the lacquer takes place by the flooding method, because it results in coated parts of high optical quality.

Within the context of the present invention, the UV range (ultraviolet) covers the wavelength range from 200 to 400 nm, the visual (visible) range covers the wavelength range from 400 to 780 nm and the IR range (infrared) covers the wavelength range from 780 to 1400 nm.

Within the scope of the present invention, transparency is understood as meaning that the background can clearly be seen when looking through the transparent material, for example in the form of a corresponding moulded body. Mere translucence, as in the case of frosted glass, for example, through which the background appears only indistinctly, is not sufficient for the corresponding material to be referred to as transparent.

Surprisingly, the object could be achieved by compositions according to claim 1 of the present invention.

It is further necessary to colour the moulded body in a colour which permits the detection of signal colours within narrow tolerances, because these colours are often no longer distinguished clearly as a result of the colouring for protective glazing for welders.

The moulded body is transparent and has an initial haze before coating of less than 3.0%, preferably 2.5%, particularly preferably less than 2.0%.

The size of the particles can be determined, for example, by means of transmission electron microscopy (TEM). Such measurements on IR absorber nanoparticles are described, for example, in Adachi et al., J. Am. Ceram. Soc. 2008, 91, 2897-2902.

The determination of the melt volume flow rate (MVR) is carried out according to ISO 1133 (at 300° C.; 1.2 kg).

The determination of the colour in transmission is carried out using a Lambda 900 spectrophotometer from Perkin Elmer with integrating sphere according to ASTM E1348 with the weighting factors and formulae described in ASTM E308.

Transmission Measurements:

The transmission measurements were carried out on a Lambda 900 spectrophotometer from Perkin Elmer with integrating sphere according to ISO 13468-2 (i.e. determination of the total transmission by measuring the diffuse transmission and direct transmission).

The transmission measurements were carried out on a Lambda 900 spectrophotometer from Perkin Elmer with integrating sphere. All the values were determined at wavelengths of from 320 nm up to and including 2300 nm with $\Delta\lambda$ 5 nm. The transmissions of individual spectral ranges (UV, visible and IR range) are the averaged measured values of those measurements.

Measurement of the relative visual attenuation coefficient for the signal light detection is carried out according to EN 1836 on a Lambda 900 spectrophotometer from Perkin Elmer with integrating sphere.

The haze was determined according to ASTM D 1003 using a BYK Gardner Haze Gard.

Determination of the notched impact strength is carried out according to ISO 180 A by a 10-fold determination on test rods measuring 80 mm×10 mm×3 mm. The measurement is carried out at a temperature of 23° C.

Materials for the Production of the Test Specimens:
Component A)
  Linear bisphenol A polycarbonate with end groups based on phenol having a melt volume flow rate (MVR) of 6 $cm^{3/10}$ min, measured at 300° C. and a 12 kg load according to ISO 1133, referred to as PC 1 hereinbelow.
Component B)
  B1) Tinuvin 326
  B2) Tinuvin 329
Component C)
  Pentaerythritol tetrastearate
Component D)
  D1) Lanthanum hexaboride, $LaB_6$ (KHDS 06 from Sumitomo Metal Mining, Japan, CAS No. 857255-66-4). The product is in the form of a pulverulent dispersion. The weights indicated in the examples are based on the product KHDS 06, the solids content of lanthanum hexaboride in the commercial KHDS 06 dispersion used being 21.5 wt. %.
  D2) Lanthanum hexaboride, $LaB_6$ (KHDS 872G2 from Sumitomo Metal Mining, Japan, CAS No. 949005-03-2). The product is in the form of a pulverulent dispersion. The weights indicated in the examples are based on the product KHDS 872G2, the solids content of lanthanum hexaboride in the commercial KHDS 872G2 dispersion used being 10.0 wt. %.
  D3) Caesium tungstate, $Cs_{0.33}WO_3$ (YMDS 874 from Sumitomo Metal Mining, Japan) is used as IR absorber. The product is in the form of an acrylate dispersion. The weights indicated in the examples are based on the caesium tungstate in the form of the pure substance, the solids content of caesium tungstate in the commercial dispersion used being 25 wt. %.
Component E)
  Lumogen IR 765 (a quaterylene, CAS No. 943969-69-5) from BASF SE, 67065 Ludwigshafen, Germany is used as organic IR absorber.
Component F)
  Black Pearls® 800 (CAS No. 1333-86-4) from Cabot Corp. are used as nanoscale carbon black (particle size about 17 nm).
Component G)
  G1) Triphenylphosphine (TPP)
  G2) Irganox 1076
Component K)
  K1) Macrolex Violet 3R
  K2) Macrolex Yellow 3G
  K3) Macrolex Blue RR
  K4) Heliogen Blue K6911 D
  K5) Macrolex Orange 3G Preparation of the Polymer Compositions by Compounding:

Compounding of the additives was carried out on a twin-shaft extruder from KraussMaffei Berstor type ZE25, at a melt temperature of 300° C. and a speed of 100 rpm, with a throughput of 10 kg/h, using the amounts of components indicated in the examples. For better mixing, a powder mixture of PC (A) (5 wt. % powder mixture, based on the total composition) containing components B) to G) is first prepared and metered into the remaining polycarbonate amount (A).

Production of the Test Specimens:

The granulate is dried for 4 hours at 120° C. in vacuo and then processed on an Arburg 370 injection-moulding machine having a 25-injection unit at a melt temperature of 300° C. and a tool temperature of 80° C. to form colour sample sheets measuring 50 mm×75 mm×Z mm; Z is 1.0; 2.0; 3.0 or 4.0 mm; for the notched impact at the same temperatures, to form test specimens measuring: 80×10×3.0 mm$^3$.

The compositions of the present invention comply with the welder protection standards EN 169 in classes 1.2 to 9.0 in wall thicknesses of from 1.0 mm to 4.0 mm. In addition, the compositions in the mentioned wall thicknesses satisfy the requirements of EN 1836 with an attenuation coefficient of from 0.80 to 1.31 in the signal colours yellow, red, green and blue equally.

TABLE 1

(Compositions indicated in wt. %, components D1 to D3 being calculated on the basis of the pure IR absorber)

| Compo-nents | Examples | | | | | | |
|---|---|---|---|---|---|---|---|
| | 1 | 2 | 3 | 4 | 5 | 6 | 7 |
| A | 99.25042 | 99.2355 | 99.29994 | 99.15969 | 98.73065 | 99.26629 | 99.27797 |
| B1 | 0 | 0 | 0 | 0.33 | 0.33 | 0.33 | 0.33 |
| B2 | 0.36 | 0.36 | 0.36 | 0 | 0 | 0 | 0 |
| C | 0.27 | 0.27 | 0.27 | 0.27 | 0.27 | 0.27 | 0.27 |
| D1 | 0 | 0 | 0 | 0 | 0 | 0.00151 | 0.00173 |
| D2 | 0 | 0 | 0.0016 | 0 | 0 | 0 | 0 |
| D3 | 0.06 | 0.065 | 0.015 | 0.0755 | 0.55375 | 0.0234 | 0.0159 |
| E | 0.0004 | 0.0008 | 0.0005 | 0.000806 | 0.000604 | 0.000755 | 0.00005 |
| F | 0.0051 | 0.0104 | 0.00145 | 0.001 | 0.0015 | 0.00025 | 0 |
| G1 | 0.05 | 0.05 | 0.05 | 0.05 | 0.05 | 0.05 | 0.05 |
| G2 | 0 | 0 | 0 | 0.05 | 0.05 | 0.05 | 0.05 |
| K1 | 0.0032 | 0.006 | 0.00126 | 0.024 | 0.0005 | 0 | 0 |
| K2 | 0.00088 | 0.0023 | 0.00025 | 0 | 0 | 0 | 0 |
| K3 | 0 | 0 | 0 | 0.0195 | 0 | 0 | 0 |
| K4 | 0 | 0 | 0 | 0.0195 | 0.013 | 0.0078 | 0.00435 |
| K5 | 0 | 0 | 0 | 0 | 0 | 0 | 0 |

| Compo-nents | Examples | | | | | | |
|---|---|---|---|---|---|---|---|
| | 8 | 9 | 10 | 11 | 12 | 13 | 14 |
| A | 99.29528 | 99.29245 | 99.29135 | 99.28388 | 99.24995 | 99.10936 | 99.29245 |
| B1 | 0.33 | 0.33 | 0.33 | 0.33 | 0.33 | 0.33 | 0.33 |
| B2 | 0 | 0 | 0 | 0 | 0 | 0 | 0 |
| C | 0.27 | 0.27 | 0.27 | 0.27 | 0.27 | 0.27 | 0.27 |
| D1 | 0.00172 | 0.000753 | 0.000753 | 0.00172 | 0.00172 | 0.00151 | 0.000753 |
| D2 | 0 | 0 | 0 | 0 | 0 | 0 | 0 |
| D3 | 0 | 0.0063 | 0.0063 | 0 | 0.0159 | 0.0234 | 0.0063 |
| E | 0 | 0 | 0 | 0 | 0.000504 | 0.000735 | 0 |
| F | 0 | 0 | 0 | 0 | 0 | 0 | 0 |
| G1 | 0.05 | 0.05 | 0.05 | 0.05 | 0.05 | 0.05 | 0.05 |
| G2 | 0.05 | 0.05 | 0.05 | 0.05 | 0.05 | 0.05 | 0.05 |
| K1 | 0 | 0 | 0 | 0 | 0 | 0 | 0.0004 |
| K2 | 0 | 0 | 0 | 0 | 0 | 0 | 0.0001 |
| K3 | 0 | 0 | 0.0001 | 0.0013 | 0.00393 | 0.02 | 0 |
| K4 | 0.003 | 0.0005 | 0 | 0 | 0 | 0 | 0 |
| K5 | 0 | 0 | 0.0015 | 0.0131 | 0.028 | 0.145 | 0 |

| Compo-nents | Examples | | | | | | |
|---|---|---|---|---|---|---|---|
| | 15 | 16 | 17 | 18 | 19 | 20 | 21 | 22 |
| A | 99.29683 | 99.27563 | 99.2639 | 99.29092 | 99.29558 | 99.26992 | 99.25447 | 99.31977 |
| B1 | 0.33 | 0.33 | 0.33 | 0.33 | 0.33 | 0.33 | 0.33 | 0 |
| B2 | 0 | 0 | 0 | 0 | 0 | 0 | 0 | 0.36 |
| C | 0.27 | 0.27 | 0.27 | 0.27 | 0.27 | 0.27 | 0.27 | 0.27 |
| D1 | 0.00172 | 0.00172 | 0.0026 | 0.000753 | 0.00172 | 0.00172 | 0.0026 | 0 |
| D2 | 0 | 0 | 0 | 0 | 0 | 0 | 0 | 0 |
| D3 | 0 | 0.059 | 0.0234 | 0.0063 | 0 | 0.0159 | 0.0234 | 0 |
| E | 0 | 0.000504 | 0.000735 | 0 | 0 | 0.00504 | 0.000735 | 0 |
| F | 0 | 0 | 0 | 0 | 0 | 0 | 0 | 0 |
| G1 | 0.05 | 0.05 | 0.05 | 0.05 | 0.05 | 0.05 | 0.05 | 0.05 |
| G2 | 0.05 | 0.05 | 0.05 | 0.05 | 0.05 | 0.05 | 0.05 | |
| K1 | 0.001 | 0.00355 | 0.00532 | 0 | 0 | 0 | 0 | 0.00011 |
| K2 | 0.00025 | 0.0006 | 0.0009 | 0.0015 | 0.002 | 0.0055 | 0.014 | 0 |
| K3 | 0.0002 | 0.0021 | 0.00315 | 0.000525 | 0.0007 | 0.00192 | 0.0048 | 0 |
| K4 | 0 | 0 | 0 | 0 | 0 | 0 | 0 | 0.00012 |
| K5 | 0 | 0 | 0 | 0 | 0 | 0 | 0 | 0 |

TABLE 1-continued (Compositions indicated in wt. %, components D1 to D3 being calculated on the basis of the pure IR absorber)

| Properties | | Examples 1 | 2 | 3 | 4 | 5 | 6 | 7 |
|---|---|---|---|---|---|---|---|---|
| Welder protection requirement | | | | | | | | |
| EN 169 satisfied | at 1.0 mm | 2.0 | 3.0 | 1.4 | 2.5 | 2.0 | 1.7 | 1.2 |
| EN 169 satisfied | at 2.0 mm | 3.0 | 5.0 | 1.7 | 5.0 | 3.0 | 2.0 | 1.7 |
| EN 169 satisfied | at 3.0 mm | 4.0 | 7.0 | 2.0 | 8.0 | 4.0 | 2.5 | 2.0 |
| EN 169 satisfied | at 4.0 mm | 5.0 | 9.0 | 2.5 | 9.0 | 5.0 | 3.0 | 2.0 |
| Attenuation coefficient | for yellow | | | | | | | |
| EN 1836 | at 1.0 mm | 1.00 | 1.00 | 1.00 | 0.78 | 0.76 | 0.85 | 0.92 |
| EN 1836 | at 2.0 mm | 1.01 | 1.01 | 1.00 | 0.80 | 0.58 | 0.73 | 0.84 |
| EN 1836 | at 3.0 mm | 1.01 | 1.04 | 1.00 | 1.14 | 0.43 | 0.61 | 0.77 |
| EN 1836 | at 4.0 mm | 1.01 | 1.12 | 1.00 | 1.69 | 0.31 | 0.51 | 0.70 |
| Attenuation coefficient | for red | | | | | | | |
| EN 1836 | at 1.0 mm | 1.03 | 1.04 | 1.01 | 1.20 | 0.68 | 0.77 | 0.87 |
| EN 1836 | at 2.0 mm | 1.05 | 1.09 | 1.01 | 1.70 | 0.47 | 0.60 | 0.76 |
| EN 1836 | at 3.0 mm | 1.09 | 1.17 | 1.01 | 2.74 | 0.32 | 0.46 | 0.66 |
| EN 1836 | at 4.0 mm | 1.13 | 1.30 | 1.02 | 4.05 | 0.22 | 0.35 | 0.57 |
| Attenuation coefficient | for green | | | | | | | |
| EN 1836 | at 1.0 mm | 1.00 | 1.00 | 1.00 | 1.14 | 1.16 | 1.10 | 1.06 |
| EN 1836 | at 2.0 mm | 1.00 | 0.99 | 1.00 | 1.13 | 1.27 | 1.18 | 1.10 |
| EN 1836 | at 3.0 mm | 0.99 | 0.98 | 1.00 | 0.96 | 1.35 | 1.25 | 1.15 |
| EN 1836 | at 4.0 mm | 0.99 | 0.92 | 1.00 | 0.70 | 1.40 | 1.31 | 1.19 |
| Attenuation coefficient | for blue | | | | | | | |
| EN 1836 | at 1.0 mm | 1.00 | 1.01 | 1.00 | 1.88 | 1.31 | 1.16 | 1.09 |
| EN 1836 | at 2.0 mm | 1.01 | 1.02 | 1.00 | 3.00 | 1.60 | 1.31 | 1.17 |
| EN 1836 | at 3.0 mm | 1.02 | 1.01 | 1.00 | 4.38 | 1.88 | 1.46 | 1.25 |
| EN 1836 | at 4.0 mm | 1.02 | 0.96 | 1.00 | 5.18 | 2.13 | 1.61 | 1.33 |
| Notched impact | | | | | | | | |
| ISO 180/A at 23° C. on 80 × 10 × 3.0 mm$^3$ | in kJ/m$^2$ | 73 | 76 | | | | | |
| MVR ISO 1133 | cm$^3$/10 min. | 5.8 | 5.8 | | | | | |
| Haze ASTM D 1003 | at 2.0 mm | 1.7 | 2.1 | 1.45 | 1.43 | | 1.27 | 0.75 |

| Properties | | Examples 8 | 9 | 10 | 11 | 12 | 13 | 14 |
|---|---|---|---|---|---|---|---|---|
| Welder protection requirement | | | | | | | | |
| EN 169 satisfied | at 1.0 mm | 1.2 | 1.2 | no | 1.2 | 1.4 | 1.7 | no |
| EN 169 satisfied | at 2.0 mm | 1.2 | 1.2 | 1.2 | 1.4 | 1.4 | 1.7 | 1.2 |
| EN 169 satisfied | at 3.0 mm | 1.4 | 1.2 | 1.2 | 1.4 | 1.7 | 2.0 | 1.2 |
| EN 169 satisfied | at 4.0 mm | 1.7 | 1.4 | 1.2 | 1.7 | 1.7 | 2.0 | 1.4 |
| Attenuation coefficient | for yellow | | | | | | | |
| EN 1836 | at 1.0 mm | 0.95 | 0.99 | 1.02 | 1.15 | 1.25 | 1.55 | 1.00 |
| EN 1836 | at 2.0 mm | 0.90 | 0.98 | 1.03 | 1.24 | 1.36 | 1.63 | 0.99 |
| EN 1836 | at 3.0 mm | 0.86 | 0.98 | 1.05 | 1.32 | 1.43 | 1.67 | 0.99 |
| EN 1836 | at 4.0 mm | 0.81 | 0.97 | 1.06 | 1.37 | 1.47 | 1.70 | 0.98 |
| Attenuation coefficient | for red | | | | | | | |
| EN 1836 | at 1.0 mm | 0.92 | 0.99 | 1.02 | 1.15 | 1.25 | 1.64 | 0.99 |
| EN 1836 | at 2.0 mm | 0.86 | 0.97 | 1.03 | 1.25 | 1.36 | 1.75 | 0.98 |
| EN 1836 | at 3.0 mm | 0.79 | 0.96 | 1.04 | 1.33 | 1.41 | 1.80 | 0.98 |
| EN 1836 | at 4.0 mm | 0.73 | 0.94 | 1.05 | 1.38 | 1.44 | 1.83 | 0.97 |
| Attenuation coefficient | for green | | | | | | | |
| EN 1836 | at 1.0 mm | 1.03 | 1.01 | 0.99 | 0.92 | 0.85 | 0.63 | 1.00 |
| EN 1836 | at 2.0 mm | 1.07 | 1.01 | 0.98 | 0.85 | 0.77 | 0.56 | 1.00 |
| EN 1836 | at 3.0 mm | 1.10 | 1.02 | 0.98 | 0.81 | 0.72 | 0.52 | 1.01 |
| EN 1836 | at 4.0 mm | 1.13 | 1.02 | 0.97 | 0.76 | 0.68 | 0.50 | 1.01 |
| Attenuation coefficient | for blue | | | | | | | |
| EN 1836 | at 1.0 mm | 1.06 | 1.00 | 0.96 | 0.77 | 0.63 | 0.39 | 1.00 |
| EN 1836 | at 2.0 mm | 1.11 | 1.01 | 0.94 | 0.64 | 0.50 | 0.35 | 1.00 |

TABLE 1-continued (Compositions indicated in wt. %, components D1 to D3 being calculated on the basis of the pure IR absorber)

| EN 1836 | at 3.0 mm | 1.16 | 1.02 | 0.91 | 0.56 | 0.43 | 0.32 | 1.00 |
|---|---|---|---|---|---|---|---|---|
| EN 1836 | at 4.0 mm | 1.22 | 1.02 | 0.88 | 0.50 | 0.39 | 0.29 | 1.00 |
| Haze ASTM D 1003 | at 2.0 mm | 0.72 | 0.57 | 1.49 | 1.84 | 1.75 | 1.65 | 0.7 |

| | | Examples | | | | | | | |
|---|---|---|---|---|---|---|---|---|---|
| Properties | | 15 | 16 | 17 | 18 | 19 | 20 | 21 | 22 |
| Welder protection requirement | | | | | | | | | |
| EN 169 satisfied | at 1.0 mm | 1.2 | 1.4 | 1.4 | no | 1.2 | 1.4 | 1.7 | no |
| EN 169 satisfied | at 2.0 mm | 1.4 | 1.7 | 2.0 | 1.2 | 1.4 | 1.7 | 2.0 | no |
| EN 169 satisfied | at 3.0 mm | 1.4 | 2.0 | 2.5 | 1.4 | 1.7 | 2.0 | 2.5 | no |
| EN 169 satisfied | at 4.0 mm | 1.7 | 2.5 | 3.0 | 1.4 | 1.7 | 2.0 | 3.0 | no |
| Attenuation coefficient | for yellow | | | | | | | | |
| EN 1836 | at 1.0 mm | 0.99 | | | 0.94 | 0.93 | 0.82 | 0.63 | 1.00 |
| EN 1836 | at 2.0 mm | 0.99 | | | 0.90 | 0.88 | 0.71 | 0.49 | 1.00 |
| EN 1836 | at 3.0 mm | 0.98 | | | 0.86 | 0.83 | 0.63 | 0.39 | 1.00 |
| EN 1836 | at 4.0 mm | 0.98 | | | 0.82 | 0.79 | 0.56 | 0.32 | 1.00 |
| Attenuation coefficient | for red | | | | | | | | |
| EN 1836 | at 1.0 mm | 1.00 | | | 0.85 | 0.81 | 0.55 | 0.22 | 1.00 |
| EN 1836 | at 2.0 mm | 0.99 | | | 0.73 | 0.67 | 0.34 | 0.07 | 1.00 |
| EN 1836 | at 3.0 mm | 0.98 | | | 0.64 | 0.56 | 0.20 | 0.03 | 1.00 |
| EN 1836 | at 4.0 mm | 0.98 | | | 0.55 | 0.47 | 0.13 | 0.01 | 1.00 |
| Attenuation coefficient | for green | | | | | | | | |
| EN 1836 | at 1.0 mm | 1.00 | | | 1.04 | 1.05 | 1.13 | 1.26 | 1.00 |
| EN 1836 | at 2.0 mm | 1.01 | | | 1.07 | 1.09 | 1.21 | 1.37 | 1.00 |
| EN 1836 | at 3.0 mm | 1.01 | | | 1.10 | 1.12 | 1.27 | 1.45 | 1.00 |
| EN 1836 | at 4.0 mm | 1.01 | | | 1.13 | 1.15 | 1.32 | 1.50 | 1.00 |
| Attenuation coefficient | for blue | | | | | | | | |
| EN 1836 | at 1.0 mm | 1.00 | | | 1.01 | 1.01 | 1.07 | 1.22 | 1.00 |
| EN 1836 | at 2.0 mm | 1.01 | | | 1.03 | 1.03 | 1.14 | 1.36 | 1.00 |
| EN 1836 | at 3.0 mm | 1.01 | | | 1.05 | 1.05 | 1.21 | 1.48 | 1.00 |
| EN 1836 | at 4.0 mm | 1.02 | | | 1.07 | 1.07 | 1.27 | 1.57 | 1.00 |
| Notched impact | | | | | | | | | |
| ISO 180/A at 23° C. on 80 × 10 × 3.0 mm$^3$ | in kJ/m$^2$ | | | | | | | | 74 |
| MVR ISO 1133 | cm$^3$/10 min. | | | | | | | | 6.9 |
| Haze ASTM D 1003 | at 2.0 mm | 0.62 | 3.12 | 3.66 | 1.48 | 1.59 | 1.94 | 1.90 | 0.3 |

The invention claimed is:

1. A heat-absorbing thermoplastic moulding composition comprising
   A) from 73.9750 to 99.9948 wt. % of at least one transparent thermoplastic plastic,
   B) from 0.05 to 0.50 wt. % of at least one UV stabiliser,
   C) from 0 to 1.00 wt. % of at least one demoulding agent,
   D) from 0.0001 to 0.500 wt. % of at least one inorganic IR absorber selected from at least one tungstate or a mixture of at least one tungstate and at least one boride, wherein the ratio of boride to tungstate is from 1:6 to 1:12,
   E) from 0.0001 to 0.01 wt. % of at least one organic IR absorber selected from the group consisting of quaterylenes, perylenes, phthalocyanines, and naphthalocyanines,
   F) from 0.0001 to 0.0150 wt. % carbon black,
   G) from 0 to 1.0 wt. % of at least one heat stabiliser,
   H) from 0 to 7.0 wt. % of at least one flame retardant,
   I) from 0 to 15.00 wt. % of further additives,
   K) from 0.0001 to 1.000 wt. % of at least one organic dye or organic dye complexes,
   wherein the sum of the parts by weight of components A to K is 100 wt. %, wherein if the composition is comprised in an article having a wall-thickness of from 1.0 mm to 4.00 mm, said article satisfies standards EN 169 in classes 1.2 to 9.00 and EN 1836 with an attenuation coefficient of from 0.80 to 1.31.

2. The composition according to claim 1, wherein the thermoplastic plastic is polycarbonate.

3. The composition according to claim 1, wherein the organic dye is selected from the group consisting of Macrolex Violet 3R, Macrolex Yellow 3G, Macrolex Blue RR, Heliogen Blue K6911 D, Macrolex Orange 3G, and combinations thereof.

4. The composition according to claim 1, wherein the composition comprises carbon black in an amount of from 0.0001 to 0.0130 wt. %.

5. The composition according to claim 4, wherein the composition comprises an organic IR absorber in an amount of from 0.0001 to 0.0080 wt. %.

6. The composition according to claim 1, wherein the composition comprises an organic IR absorber in an amount of from 0.0001 to 0.0080 wt. %.

7. The composition according to claim 1, wherein the heat stabiliser is selected from the group consisting of triphenylphosphine, Irganox 1076, and combinations thereof, the heat stabilisers being present in an amount of from 0.01 to 0.50 wt. %.

8. The composition according to claim 1, wherein the organic dyes are present in an amount of from 0.0004 to 0.2000 wt. %.

9. An article comprising the composition according to claim 1, wherein the article is eye-protection equipment.

10. The article of claim 9, wherein the article has a wall-thickness of from 1.0 mm to 4.00 mm, and wherein said article satisfies standards EN 169 in classes 1.2 to 9.00 and EN 1836 with an attenuation coefficient of from 0.80 to 1.31.

11. The composition according to claim 1, wherein component F) has a mean primary particle size of from 10 to 50 nm and a BET surface area determined according to ISO 4652 of at least 20 $m^2/g$.

12. The composition according to claim 1, consisting of the following components present in the following amounts A) from 85.00 wt. % to 99.90 wt. % of at least one transparent thermoplastic plastic,
B) from 0.10 to 0.45 wt. % of at least one UV stabiliser,
C) from 0.05 to 0.75 wt. % of pentaerythritol tetrastearate,
D) from 0.0004 to 0.2000 wt. % of least one inorganic IR absorber is caesium tungstate or a mixture of lanthanum hexaboride and caesium tungstate,
E) from 0.0001 to 0. 0080 wt. % of at least one organic IR absorber selected from the group consisting of quaterylenes, perylenes, phthalocyanines, and naphthalocyanines,
F) from 0.0001 to 0.0130 wt. % carbon black,
G) from 0.01 to 0.05 wt. % of triphenylphosphine or Irganox 1076,
H) from 0 to 7.0 wt. % of at least one flame retardant,
I) from 0.05 to 5.00 wt. % of further additives,
K) from 0.0002 to 0.50 wt. % of at least one organic dye or organic dye complexes, wherein the sum of the parts by weight of components A to K is 100 wt. %.

* * * * *